United States Patent
Helgerson et al.

(10) Patent No.: US 7,175,018 B2
(45) Date of Patent: Feb. 13, 2007

(54) CONVEYOR ASSEMBLY (75) Inventors: David E. Helgerson, Plymouth, MN (US); Brian D. Koenig, Hastings, MN (US); Steven A. Jensen, Norwood Young America, MN (US); John Fresonke, Minneapolis, MN (US); Timothy J. Hall, Hopkins, MN (US)

(73) Assignee: Magstar Technologies, Inc., Hopkins, MN (US)

( * ) Notice: Subject to any disclaimer, the term of this patent is extended or adjusted under 35 U.S.C. 154(b) by 0 days.

(21) Appl. No.: 11/232,732

(22) Filed: Sep. 22, 2005

(65) Prior Publication Data
US 2006/0016668 A1   Jan. 26, 2006

Related U.S. Application Data (62) Division of application No. 10/622,623, filed on Jul. 18, 2003, now Pat. No. 6,959,804.

(60) Provisional application No. 60/397,234, filed on Jul. 19, 2002.

(51) Int. Cl.
B65G 13/02 (2006.01)
(52) U.S. Cl. .................. 198/780; 198/781.05; 198/788
(58) Field of Classification Search ........... 198/781.06, 198/781.01, 781.05, 780, 788, 789
See application file for complete search history.

(56) References Cited

U.S. PATENT DOCUMENTS

| | | | | |
|---|---|---|---|---|
| 5,568,858 A * | 10/1996 | Thompson | ............. | 198/781.06 |
| 5,730,274 A * | 3/1998 | Loomer | .................. | 198/781.06 |
| 6,047,812 A * | 4/2000 | Horn et al. | ............ | 198/781.06 |
| 6,244,427 B1 * | 6/2001 | Syverson | ..................... | 198/788 |
| 6,378,694 B1 * | 4/2002 | Onoyama et al. | ...... | 198/781.06 |
| 6,460,683 B1 * | 10/2002 | Pfeiffer | .................. | 198/781.05 |
| 6,672,449 B2 * | 1/2004 | Nakamura et al. | .......... | 198/788 |
| 6,710,505 B1 * | 3/2004 | Barani et al. | ................ | 198/788 |
| 6,898,483 B2 * | 5/2005 | Wielebski et al. | ...... | 198/781.06 |
| 2002/0084173 A1 * | 7/2002 | Paquette | ................ | 198/781.06 |

* cited by examiner

Primary Examiner—James R. Bidwell
(74) Attorney, Agent, or Firm—Vidas, Arrett & Steinkraus, P.A.

(57) ABSTRACT

The conveyor apparatus disclosed herein is generally formed of a first rail and a second rail, each rail having a plurality of rollers. A portion of the rollers are desirably drive rollers, receiving power from an integral motor assembly. The motor generally comprises a stator that is coupled to the rail and an outer roller assembly rotatably coupled to the rail. The roller assembly includes an outer circumferential magnetized portion positioned in surrounding engagement to the motor stator and functions both as the motor rotor and the conveying surface of the roller. Non-slip roller covering material may be attached to the exterior of the roller assembly. A circuit board having logic controls is preferably in communication with at least one sensor and the motor rotor to regulate rotation of the motor rotor during use of the conveyor.

9 Claims, 6 Drawing Sheets

CONVEYOR ASSEMBLY

CROSS-REFERENCE TO RELATED APPLICATIONS

This application claims priority to and is a Divisional of application Ser. No. 10/622,623, filed Jul. 18, 2003, now U.S. Pat. No. 6,959,804 which claims priority to Provisional Application Ser. No. 60/397,234, filed Jul. 19, 2002, the entire contents of which are hereby incorporated by reference in their entireties.

BACKGROUND OF THE INVENTION

In the past, conveyors have been formed of passive rollers, mechanically rotated rollers or a combination thereof. The most common types of mechanical drive apparatus utilized to rotate rollers of a conveyer include, but are not necessarily limited to, belt drives, chain drives, and/or shaft drive mechanisms. The use of these types of drive mechanisms generally require relatively large conveyors or structures. In addition, the known types of conveyors or drive mechanisms are difficult to keep clean, as the belts, chains, and/or shaft drive mechanisms frequently accumulate dirt and/or become soiled during use.

The known conveyor systems generally are undesirable for use within a clean room environment. Frequently, clean room specifications are incompatible and do not tolerate the level of dirt and discharged particles associated with the use of a conventional conveyor. Typically, a business having a clean room is required to forgo use of a conveyor within that room due to the cleanliness issues. Further, clean rooms are expensive and have a high cost per unit area. A clean room within a business is preferably of moderate size, and therefore not readily amendable to the use of a relatively large conventional conveyor structure.

A need therefore exists for a new type of conveyor which may be utilized within a clean room environment. Desirably, a clean room conveyor will be of economic size, having an overall compactness and a high ratio of transport tray width to total apparatus width.

Without limiting the scope of the invention a brief description of some of the claimed embodiments of the invention is set forth below. Additional details of the described embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF DESCRIPTION OF THE INVENTION

It is a principle advantage of the present invention to provide a conveyor formed of relatively simple and inexpensive components and design which fulfills the intended purpose of being sufficiently clean for use with in a clean room which simultaneously fulfills the intended purpose of functioning as a conveyor while minimizing the risk of damage to manufactured goods.

Another principle advantage of the present invention is to provide a conveyor having a recessed pocket containing motor components.

It is still another principle advantage of the present invention to provide a conveyor having a motor stator fixedly attached to a structural rail.

It is still another principle advantage of the present invention to provide a circuit board connected to the motor stator.

It is still another principle advantage of the present invention to provide a motor rotor comprising alternating magnetic pole portions disposed in a generally circumferential housing arranged about the motor stator.

Still another principle advantage of the present invention is a provision of a motor rotor used as the conveying roller surface.

Still another principle advantage of the present invention is a provision of non-slip roller material as covering the outer rolling surface of the motor rotor.

Still another principle advantage of the present invention is a provision of a conveyor which minimizes discharge of debris during operation within a clean room environment.

Still another principle advantage of the present invention is a provision of a statically dissipative conveyor suitable for use with static sensitive products.

Still another principle advantage of the present invention is to provide a conveyor having a high ratio of moving conveyor track width to total device width.

Still another principle advantage of the present invention is to provide a low profile conveyor that does not utilize a belt, chain or equivalent thereof to provide power to the rollers.

Still another principle advantage of the present invention is the mounting of the circuit board controller to the conveyor where the circuit board controller card is connected to sensors and includes logic controls and a motor control for selectively activating an individual motorized roller.

Still another principle advantage of the present invention is the provision of sensors mounted directly to a circuit board, the circuit board mounted within a structural rail, and apertures or sensor windows in the structural rail, through which the sensors may detect the presence of an object.

Still another principle advantage of the present invention is a provision of a conveyor having zones having approximately one sensor and two motorized rollers and two oppositely aligned idle rollers per zone.

Still another principle advantage of the present invention is a provision of a conveyor having independent control between zones for advancement of product to an adjacent downstream zone provided that the adjacent downstream zone has been signaled to be open for receipt of product.

In one embodiment, the present invention comprises a conveyor assembly including a first rail, a second rail and a plurality of rollers, a portion of which are motorized rollers. For each motorized roller, the first rail includes a recessed portion and a bearing assembly located within the recessed portion. A motor stator is coupled to the first rail proximal to the bearing assembly. An outer roller housing is rotatably coupled to the first rail and arranged to engage said bearing assembly. The roller housing further includes a circumferential plurality of alternating magnetic poles arranged about the stator. Thus, the roller housing of a motorized roller functions as both the motor rotor and the roller outer conveying surface.

These and other embodiments which characterize the invention are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there is illustrated and described a embodiments of the invention.

BRIEF DESCRIPTION OF THE SEVERAL VIEWS OF THE DRAWING(S)

A detailed description of the invention is hereafter described with specific reference being made to the drawings.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 1:
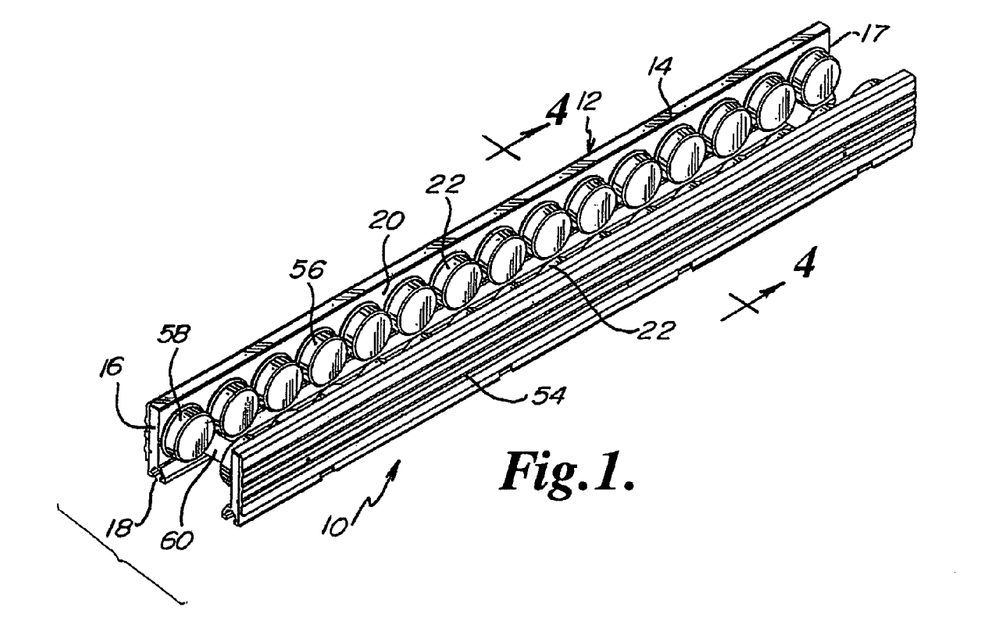
FIG. 1 is a perspective view of an embodiment of an inventive conveyor assembly.
Figure 2A:
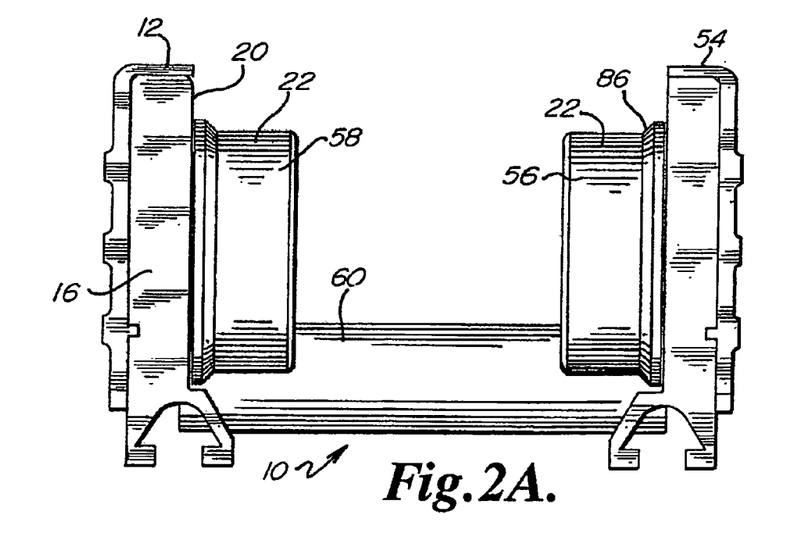
FIG. 2A is a front view of an embodiment of an inventive conveyor assembly.
Figure 2B:
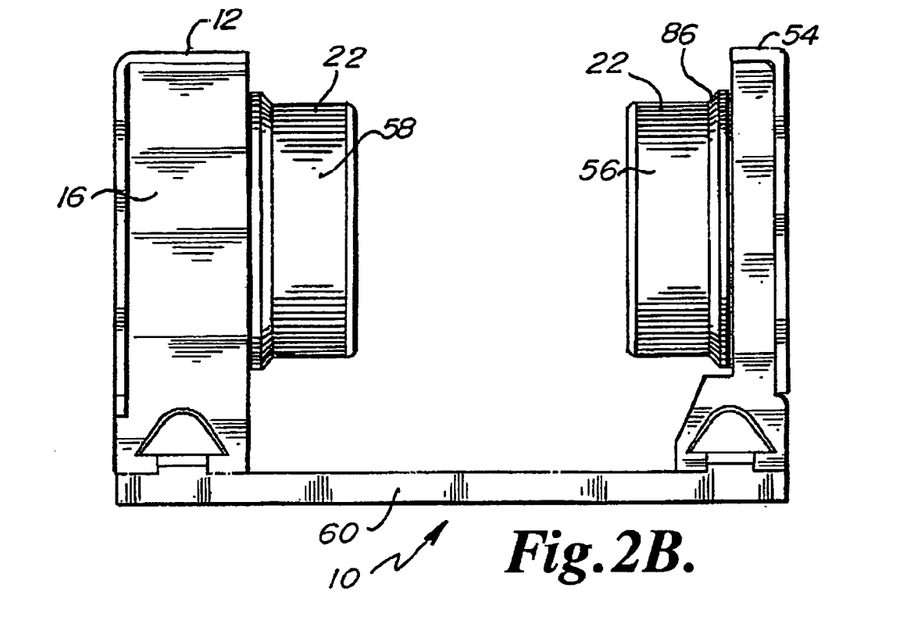
FIG. 2B is a front view of another embodiment of an inventive conveyor assembly.

Referring to FIGS. 1–2B, an embodiment of a conveyor assembly 10 according to the present invention is depicted. The conveyor assembly 10 desirably includes a first rail 12, a second rail 54, spacing members 60 and a plurality of rollers 22. The first rail 12 is desirably a drive rail, and may generally include a top surface 14, a first end 16, a second end 17, a channel 18 and an operational face 20. A plurality of rollers 22 are spaced along the operational face 20. In one embodiment, every other roller 22 of the drive rail 12 comprises a powered or drive roller 58. Rollers that are not powered rollers 58 are passive or idle rollers 56. Other embodiments may include varying numbers of powered rollers 58 and passive rollers 56. The idle rollers 56 may be alternated with the drive rollers 58 or configured in any desired combination. Generally, the passive rail 54 includes only idle rollers 56, although the passive rail 54 may be modified to include drive rollers 58.

The first rail 12 and the second rail 54 are desirably coupled to the spacing members 60. The spacing between the rails may be selected as desired for the particular application of the conveyor assembly 10.

The length of the conveyor assembly 10 may be increased and/or decreased dependent upon the manufacturing requirements for product and preferably may be as short as desired. The number of rollers 22 and the spacing of the rollers 22 may vary as required for the particular application.

The conveyor assembly 10 may be supported by any suitable means known in the art. For example, the conveyor 10 may be provided with leg sets or frame stands. Alternatively, the conveyor may be wall-mounted or secured to a table or shelf.

In a preferred embodiment, the second rail 54 is a passive rail. Thus, all rollers 22 on the second rail 54 may be idle rollers 56, and all motor components and control circuit components for the conveyor assembly 10 may be contained within the drive rail 12. Spacing of the rollers 22 on the second rail 54 is desirably equal to the spacing of the rollers on the first rail 12.

Referring to FIGS. 3–6, embodiments of the drive rail 12 and the passive rail 54 are depicted in greater detail. In the drive rail embodiment of FIG. 3, every other roller 22 is preferably a powered roller 58. At regular intervals along the operational face 20 of the drive rail 12, recessed pockets or portions 24 may be provided. Desirably, one recessed portion 24 is provided for each powered roller 58. Portions or components of the powered roller 58 may be positioned within the recessed portions 24 of the drive rail 12, thereby providing for added compactness of the conveyor system.

Figure 3:
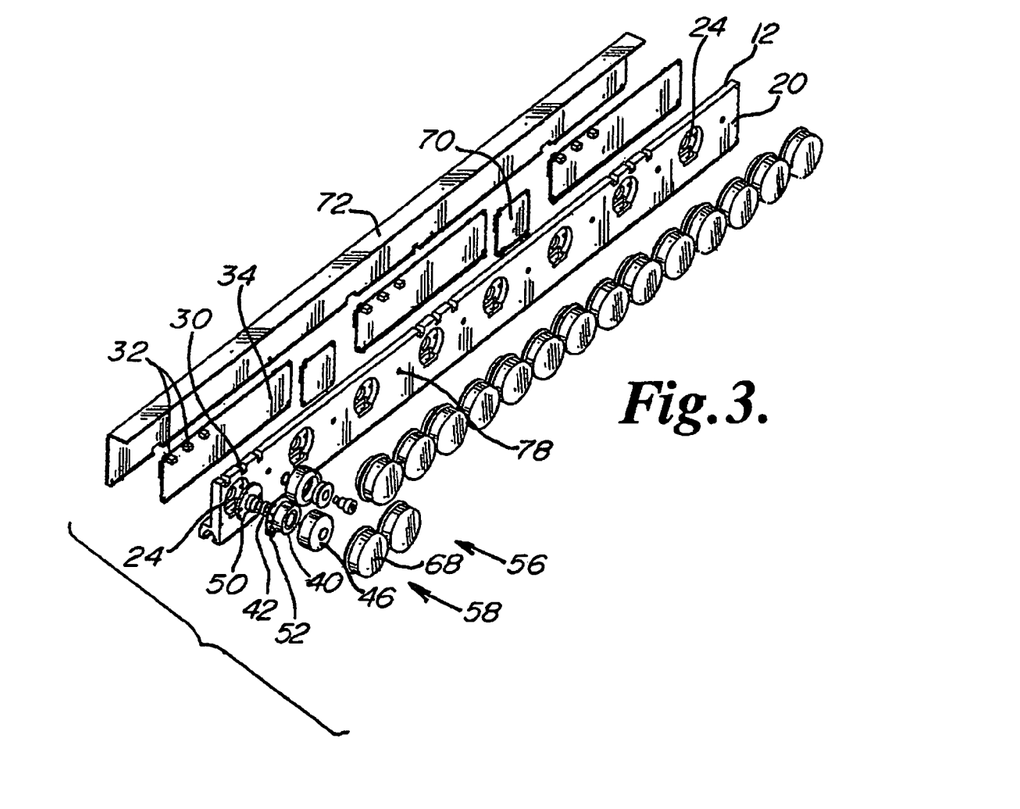
FIG. 3 is an exploded perspective view of an embodiment of a drive rail of an inventive conveyor assembly.
Figure 4:
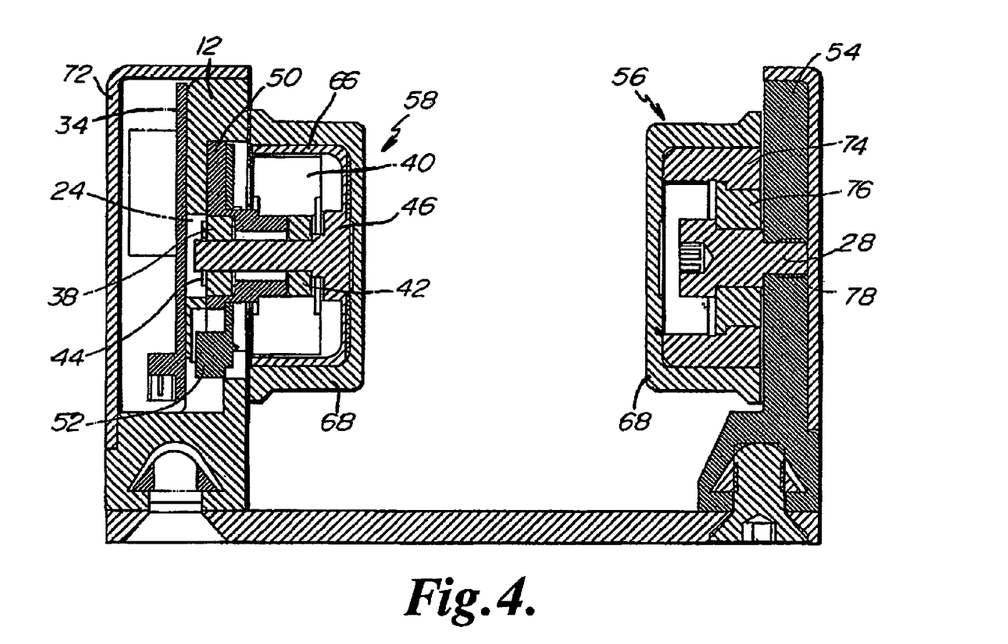
FIG. 4 is a cross-sectional end view of an embodiment of an inventive conveyor assembly taken along line 4—4 of FIG. 1.

In one embodiment, a motor housing or back plate 50 is coupled to the drive rail 12 within the recessed portion 24. A sealed bearing 38 and a motor circuit board 52 are mounted to the motor housing 50, also being located within the recessed portion 24. A motor stator 40 is fixedly attached to the motor housing 50. The motor circuit board 52 may include Hall-effect sensors and power lines for distribution to the individual pole windings of the stator 40. Desirably, the stator 40 will be mounted outside of the recessed portion 24, although some or all of the stator 40 may be within the recessed portion in some embodiments.

An outer roller body assembly/motor rotor 46 is rotatably supported by the bearing 38 and may be retained by a retaining ring 44. A second sealed bearing 42 located proximal to the stator 40 may further rotatably support the outer roller body assembly 46.

The outer roller body assembly 46 desirably includes an annular portion 66 positioned circumferentially around the stator 40. The annular portion 66 includes a plurality of alternating magnetic pole portions and acts as the rotor of the motor within the drive roller 58. Thus, the roller portion 46 of the drive roller 58 that supports and moves objects upon the conveyor assembly 10 also functions as the motor rotor.

Figure 5:
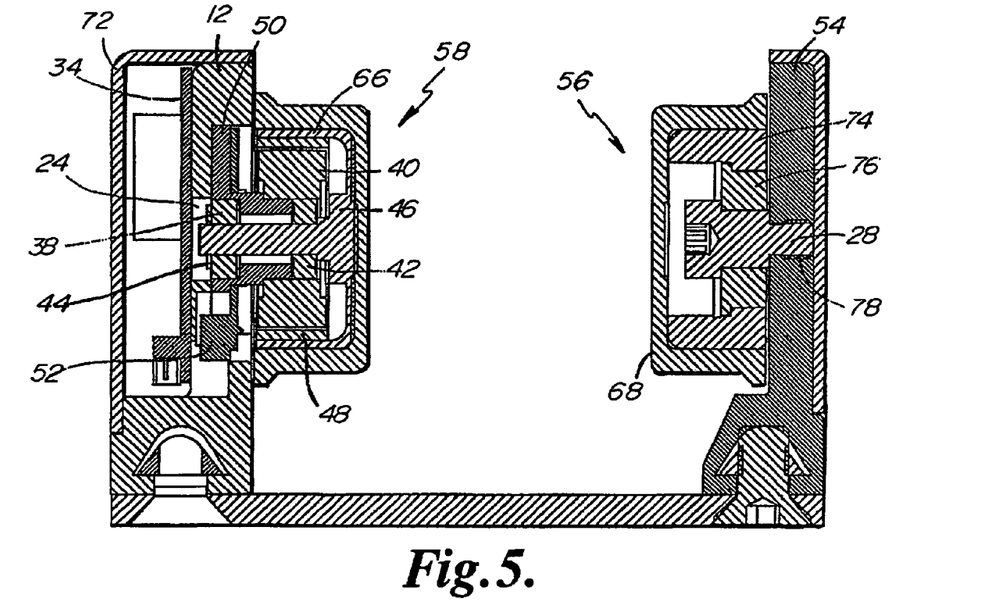
FIG. 5 is a cross-sectional end view of another embodiment of an inventive conveyor assembly taken along line 4—4 of FIG. 1.

In an alternative embodiment, as depicted in FIG. 5, the annular portion 66 of the outer roller body assembly 46 need not be magnetized directly. The outer roller body assembly 46 further includes one or more magnets 48 to provide similar functionality. Desirably, a magnet 48 will be in the shape of a ring, having circumferentially alternating magnetic pole portions.

While the components of the drive roller 58 described herein form a DC brushless motor, certain embodiments of the invention may substitute other types of motors, such as DC brush motors, stepper motors, switched reluctance motors, brushless AC motors, AC induction motors, flat wire-wound motors and the like. In some embodiments, a motor circuit board 52 as depicted in FIG. 3 may not be required. In some cases, a commercially available motor may be modified for use within the drive roller 58, or individual parts of a commercially available motor may be selected.

Figure 6:
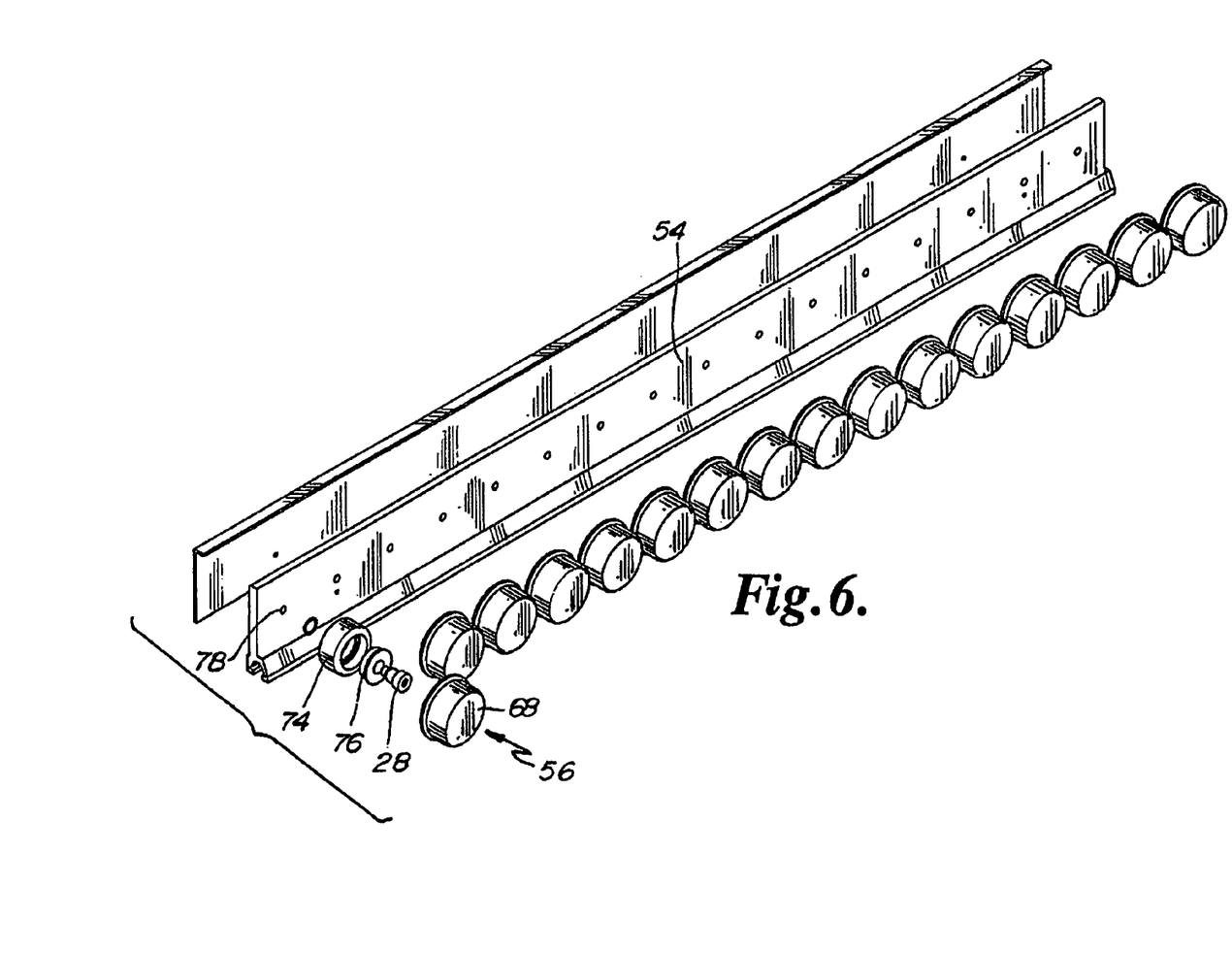
FIG. 6 is an exploded perspective view of an embodiment of a passive rail of an inventive conveyor assembly.

The drive rail 12 may also include passive rollers 56. Further, all rollers 22 contained on the passive rail 54 may be passive rollers 56. Passive rollers 56 generally comprise an annular roller 74, a passive roller bearing 76 and a shoulder screw 28. The shoulder screw 28 is received by a hole or cavity 78 in the rail to which the passive roller 56 is rotatably coupled.

Both powered rollers 58 and passive rollers 56 may include a cover portion 68. The cover portion 68 is desirably a non-slip material such as urethane, which is arranged to engage product placed on the conveyor assembly 10. For some applications, the cover portion 68 may be made from a slippery material having a coefficient of friction lower than that of the outer roller body assembly 46. In some embodiments, the cover portion 68 may be made from an electrically conductive material.

The conveyor apparatus 10 may further include logic controls and object sensors to control conveyor operation. While a circuit board may be located remotely or proximal to the conveyor 10, it is desirably contained within the drive rail 12. In a preferred embodiment, sensors and circuit boards may all be contained within the drive rail 12. In various embodiments, additional sensors may be used in the passive rail 54, or all of the sensors for the conveyor may be contained in the passive rail 54.

Referring to FIG. 3, an embodiment of a drive rail 12 that includes circuit boards 34 and sensors 32 is depicted. Desirably, the sensors 32 may be mounted directly upon the circuit board 34, and the circuit board 34 positioned within the drive rail 12. When circuit boards 34 are located within a rail, a shroud 72 may be used. When sensors 32 are mounted directly to a circuit board 34, and the circuit board 34 is integrated into the drive rail 12, a window or aperture 30 is desirably provided in the drive rail 12 through which the sensor 32 may sense the presence of an object upon the conveyor.

Each sensor 32 may be any type of sensor known in the art for detecting the presence of an object proximal to the sensor 32. As depicted in FIG. 3, each sensor 32 comprises an infra-red sensor and includes both a transmitter and a receiver.

Each sensor 32 is preferably in communication with a circuit board 34 having a drive controller which is utilized to control the rotation of various drive rollers 58. Circuit boards 34 may further contain circuitry for powering at least one motor, a logic controller and connectors for communication with drive rollers 58, sensors 32, additional circuit boards 34 and slave circuit boards 70, remote operation instructions and for programming. The drive rollers 58 controlled by a single circuit board 34 may be grouped into a zone. Thus, portions of the conveyor may be zoned into combinations of drive rollers 58 or combination of drive rollers 58 and idle rollers 56. For example, a zone may include two drive rollers 22 and two oppositely aligned idle rollers 56 as grouped with one sensor 32. Alternately, a zone may be formed of one drive roller 58 and one adjacent idle roller 56 and two oppositely aligned idle rollers 56 as grouped with one sensor 32. Further, a zone may be defined by a number of proximal drive rollers 58 that are controlled by a given logic circuit. The idle rollers 56 proximal to or opposite the included drive rollers 58 may or may not be included in the definition of a zone. It should be noted that any desired number of drive rollers 58, idle rollers 56 and/or sensors 32 may be utilized and grouped into a desired zone.

As the length of a zone is extended, slave circuit boards 70 may be daisy-chained to a primary circuit board 34 in order to control additional drive rollers 58. For example, in the embodiment of FIG. 3, each primary circuit board 34 may include sensors 32, a logic circuit and the electronic controllers for two drive rollers 58. A slave circuit board 70 may include the electronic controller for an additional drive roller 58. As such, the slave board 70 receives operation instructions from the primary circuit board 34 and operates the additional drive roller identically to the operation of the primary drive rollers. Any number of slave boards 70 may be used with each primary circuit board 34 to extend a zone as desired, wherein all drive rollers 58 within that zone operate simultaneously and according to the sensors 32 of the zone's primary circuit board 34.

Figure 7:
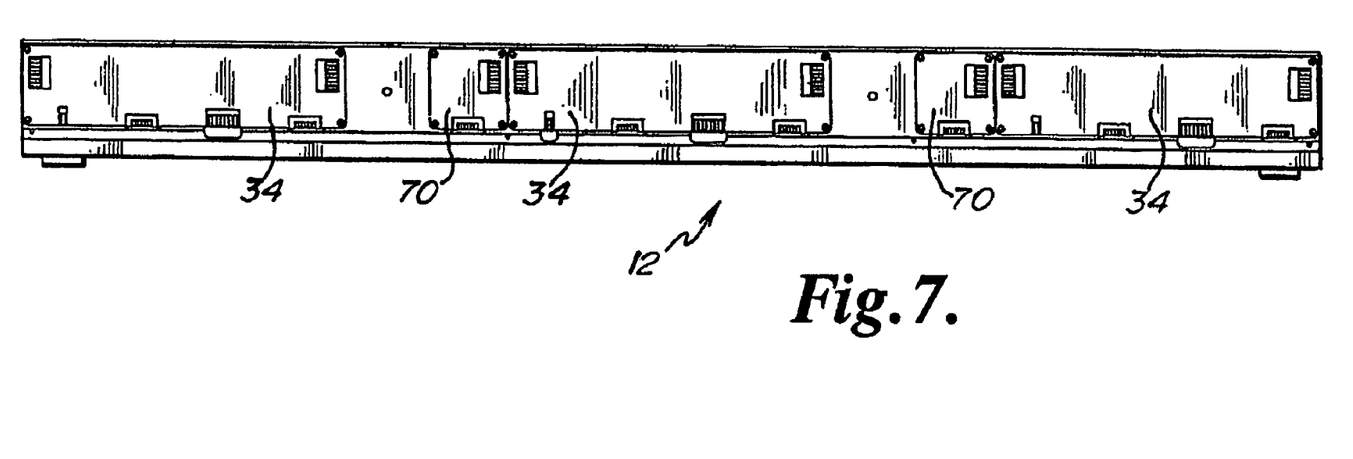
FIG. 7 is a side view of an embodiment of a drive rail of an inventive conveyor assembly showing internal circuit boards.

FIG. 7 depicts an embodiment of a drive rail 12 having three distinct zones of operation. The first and second zones each include a primary circuit board 34 and a single slave board 70. The third zone does not include a slave board.

During operation, generally the logic controller for each zone permits engagement of a drive roller 58 only when space is available for product advancement. If the sensor 32 signals the presence of product, then the logic controller may or may not permit rotation of the drive rollers 58 in the zone, thereby either conveying the product or holding the position of product relative to the conveyor 10. The exact operation depends upon the logic programmed into the zone controller and the location of sensors within the zone. Further, each circuit board 34 may be provided with a reprogrammable logic controller.

The circuit boards 34 of adjacent zones may be arranged to provide one another with product location information. Advancement of product on the conveyor 10 in some embodiments desirably will not occur until such time as a sensor 32 has indicated the existence of a free zone for advancement of the product. Adjacent zones may also be arranged to instruct one another to operate. For example, a controller for a first zone may check for the presence of an object at one of its sensors 32. If an object is detected, the controller may activate the drive rollers 58 located within the first zone, thereby sending the object to an adjacent second zone. Further, the first zone controller may instruct the second zone controller to activate the drive rollers 58 of the second zone, further conveying the object. Duration of drive roller 58 activation may be any proper time as chosen for the application. For example, the drive rollers 58 may operate for a specified time interval, or may operate until a signal or instruction is received from either its sensors 32 or an adjacent zone controller.

While a single sensor 32 per zone may be used, various embodiments may include any number of additional sensors. Referring to FIG. 3, each primary circuit board 34 depicted includes three sensors 32. Multiple sensors may allow for additional modes of operation. For example, a zone may include a first sensor and a second sensor. As a product advances forward, the presence of the product may first be detected by the first sensor, then as operation continues, the second sensor. Therefore, the conveyor zone may be arranged to stop when both sensors detect the object. Further, the zone may be arranged to have the first sensor trigger a secondary, slower advancement speed at which the drive rollers 58 operate when the first sensor detects the object but the second sensor does not. Thus, as the conveyed object gets close to the stop point, its rate of advancement may be reduced.

Multiple sensors may also allow for operation in the reverse direction. For example, the zone may operate in reverse while the conveyed object is detected by both sensors, and then stop after the object passes the second sensor.

The present conveyor apparatus 10 provides a conveyor suitable for use in a clean room having a high ratio of moving conveyor or transport tray width to total apparatus width. One desirable use for the present conveyor 10 is in the manufacture of computer parts. For example, computer hard drives are manufactured under clean room specifications. Individual disc components of a hard drive are often transported in disc packages, such as the type described in U.S. Pat. No. 4,557,382.

Figures 8, 9:
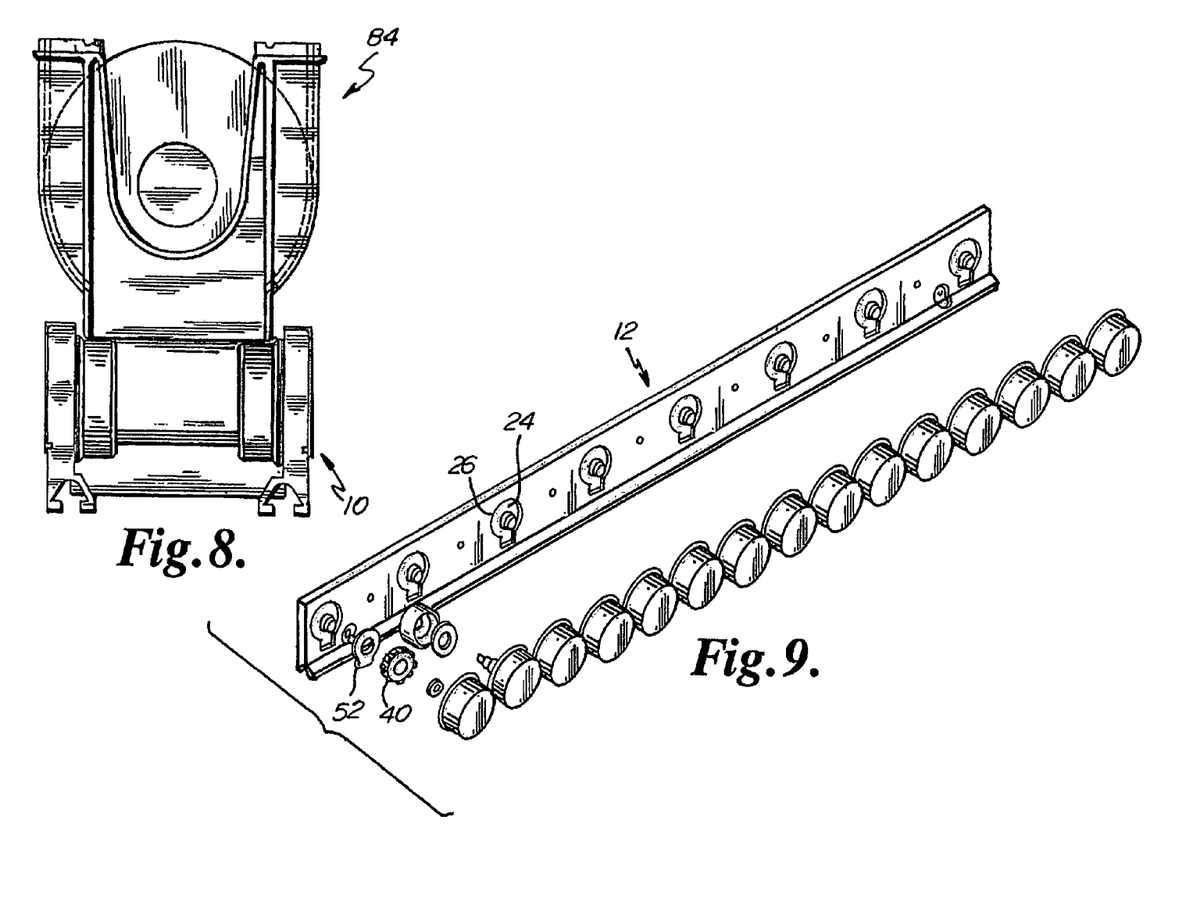
FIG. 8 depicts an object being conveyed upon an embodiment of an inventive conveyor assembly.
FIG. 9 is an exploded perspective view of another embodiment of a drive rail of an inventive conveyor assembly.

FIG. 8 depicts a typical disc package 84 upon an embodiment of the present conveyor apparatus 10. Prior art conveyor assemblies having a transport tray width appropriate to convey a disc package 84 as depicted typically have an overall width that is considerably wider than the widest portion of the disc package 84. Thus, the prior art conveyor, and specifically its width dimension, has often been a limiting factor in the design layout of an assembly line utilizing disc packages 84.

As shown in FIG. 8, the present conveyor 10 may be arranged to transport a disc package 84. Due to the inventive design, the total width of the present conveyor 10 may be less than the total width of the disc package 84. Therefore, the disc package 84 width dimension becomes the limiting factor when the present conveyor 10 is used.

In one embodiment, each drive roller 58 is capable of generating approximately 2 to 6 ounce-inches of torque. Using a rotor 46 and stator 40 capable of this torque output, the conveyor apparatus 10 may have a total rail height of 3 inches or less. Desirably, the rail height may be 2 and 7/8 inches or less. Further, using a rotor 46 and stator 40 capable of this torque output, the overall conveyor width may be approximately 3.0 inches and may further be only 1.5 inches wider than the width of the transport tray. In some embodiments, the overall conveyor width may be no more than 1 inch wider than the transport tray width.

A drive roller 58 capable of producing up to 6 ounce-inches of torque will desirably have a diameter of 1.7 inches or less. The torque output of each drive roller 58 may be selected depending upon the weight of the object to be conveyed by the drive roller 58. Torque output may be adjusted by selecting different embodiments of the stator 40 and rotor assembly 46. For example, a stator 40 and rotor assembly 46 having more or less magnetic pole portions may be used. Additionally, smaller or larger components may be used. If a small amount of torque is required, a smaller diameter stator 40 and rotor assembly 46 may be used. As such, the diameter of the drive roller 58 may be reduced. Likewise, the torque output may be increased by selecting larger components, which may increase drive roller 58 diameter. Preferably, the diameter of idle rollers 56 will be selected to match the diameter of the drive rollers 58.

Both drive rollers 58 and idle rollers 56 may include an angled edge 86 proximal to the rail operational face 20, as best shown in FIG. 2A. Generally an angled edge 86 has a width dimension of less than 1/8 of an inch. Rollers 22 are not required to include an angled edge 86, and may terminate prior to the operational face 20 or may extend into the recessed pocket 24 of the drive rail 12. Generally the top surface 14 of a drive rail 12 extends outwardly from the operational face 20 for a width dimension of approximately 1.125 inches or less, and the top surface 14 of a passive rail 54 extends outwardly from the operational face 20 for a width dimension of approximately 0.375 inches or less when using drive rollers 58 capable of producing up to 6 ounce-inches of torque output. Desirably the height of both rails of such a conveyor assembly 10 will be less than approximately 3 inches.

Further, the rollers 22 are desirably configured to have a narrow dimension across the width of the conveyor 10. A large space between the rollers 22 creating a wide open center portion of the transport tray allows for optimum clean room airflow and space for auxiliary devices, such as lifts, locating stops and the like. Desirably, the rollers 22 will extend less than 0.6 inches into the width of the transport tray. More desirably, the rollers 22 will extend less than 0.5 inches into the width of the transport tray.

In an alternative embodiment, when a circuit board is not mounted within the drive rail 12, the width of the top surface 14 of the drive rail 12 may be further reduced to a dimension of approximately 0.625 inches or less, when using drive rollers capable of producing up to 6 ounce-inches of torque output.

The present conveyor apparatus 10 may be static dissipative in order to be used with static sensitive materials. For example, the roller cover portions 68, rotor assembly 46, bearings 38, 42, motor housing 50 and rail 12 may all be electrically conductive and be electrically connected to ground. A statically dissipative conveyor will desirably allow no more than 30–50 volts of charge to build on the conveyor before safely discharging.

In an alternative embodiment, as depicted in FIG. 9, the drive rail 12 may be provided having recessed portions 24 that include a support post 26. Thus, the motor housing or back plate 50 as shown in FIG. 3 need not be used. The motor circuit board 52 and the stator 40 may be mounted directly to the support post 26. Thus, the stator 40 may be directly coupled to the drive rail 12.

Further, the drive rail 12 may be provided having recessed portions 24 that include supports for bearing mechanisms 38. Built-in supports will desirably be left during machining of the recessed portions 24 into the rail 12.

In another alternative embodiment, the drive rail 12 width may be further reduced by positioning the circuit boards 34 outside of and remote from the rail, desirably under the conveyor. When remotely positioned circuit boards are used, the sensors 32 will typically not be mounted to the circuit boards 34, but will be mounted to the rail and electronically connected to the circuit board 34.

In another alternative embodiment, the conveyor apparatus 10 may be provided without logic controls or sensors 32, wherein all drive rollers 58 run continuously.

The conveyor apparatus 10 is designed to meet, at a minimum, Class 4 of the ISO 14644-1 classification standard of airborne particulate cleanliness. Desirably, the conveyor apparatus 10 will comply with Class 3 of ISO 14644-1.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A conveyor for moving an object comprising:
   a first rail;
   a second rail positioned substantially parallel to said first rail;
   a rail aperture traversing at least one of said first rail and said second rail;
   a roller coupled to at least one of said first rail and said second rail;
   a motor arranged to engage said roller;
   a circuit board having a controller arranged to control said motor; and
   a sensor mounted to said circuit board;
   wherein said circuit board is mounted to one of said first rail and said second rail such that said sensor detects the presence of an object upon said roller through said rail aperture.

2. A conveyor for moving an object comprising:
   a first rail having a recessed portion;
   a bearing assembly located within said recessed portion, the bearing assembly comprising a plurality of bearings;
   a stator proximal to said bearing assembly; and
   a roller member rotatably coupled to said rail via said bearing assembly;
   wherein said roller member includes a circumferential plurality of alternating magnetic poles arranged about the stator.

3. The conveyor of claim 2, further comprising a control circuit board having a controller arranged to control the operation of said roller member.

4. The conveyor of claim 3, further comprising a sensor, wherein said controller is arranged to control the operation of said roller member depending upon a signal received from said sensor.

5. The conveyor of claim 4, wherein said sensor is mounted to said control circuit board and arranged to detect the presence of an object upon said roller through an aperture in said rail.

6. The conveyor of claim 2, further comprising an idle roller rotatably coupled to said rail.

7. The conveyor of claim 2, thither comprising a second rail having at least one idle roller.

8. The conveyor of claim 2, further comprising a covering upon the external surface of said roller member.

9. A conveyor for moving an object comprising:
   a first rail comprising plurality of recessed pockets;
   a second rail;
   a plurality of motor stators engaged the first rail;
   a plurality of passive rollers coupled to at least one of said first rail and said second rail;
   a plurality of drive rollers coupled to the first rail, each drive roller comprising a motor rotor proximate to one of said motor stators;
   a source of electrical power coupled to said motor stators;
   a circuit board having a controller arranged to control said electrical power for rotation of at least one of said motor rotors relative to a motor stator;
   wherein said motor stators and said motor rotors comprise an internal motor within each of said drive rollers, and a portion of the internal motor of each drive roller is located within a recessed pocket.

* * * * *